(12) United States Patent
Stellmann et al.

(10) Patent No.: US 9,242,328 B2
(45) Date of Patent: Jan. 26, 2016

(54) MONITORING DEVICE OF A MACHINE TOOL

(75) Inventors: Georg Stellmann, Ludwigsburg (DE); Sebastian Jackisch, Ludwigsburg (DE); Ralph Dammertz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 878 days.

(21) Appl. No.: 13/504,432

(22) PCT Filed: Aug. 27, 2010

(86) PCT No.: PCT/EP2010/062523
§ 371 (c)(1),
(2), (4) Date: Jul. 4, 2012

(87) PCT Pub. No.: WO2011/051014
PCT Pub. Date: May 5, 2011

(65) Prior Publication Data
US 2012/0266665 A1  Oct. 25, 2012

(30) Foreign Application Priority Data
Oct. 27, 2009 (DE) .......................... 10 2009 046 040

(51) Int. Cl.
H02H 11/00 (2006.01)
B23Q 11/00 (2006.01)
B23D 59/00 (2006.01)
B23Q 17/24 (2006.01)
B27B 5/22 (2006.01)
B27G 19/02 (2006.01)

(52) U.S. Cl.
CPC .......... B23Q 11/0082 (2013.01); B23D 59/001 (2013.01); B23Q 17/2438 (2013.01); B27B 5/222 (2013.01); B27G 19/02 (2013.01)

(58) Field of Classification Search
CPC .......... B23Q 11/0082; B23Q 17/2438; B23D 59/001; B27G 19/02; B27B 5/222
See application file for complete search history.

(56) References Cited

U.S. PATENT DOCUMENTS

| 2005/0155473 A1 | 7/2005 | Gass | |
|---|---|---|---|
| 2006/0197020 A1* | 9/2006 | Trzecieski | A22B 5/163 250/342 |
| 2010/0180740 A1* | 7/2010 | Krapf | B23Q 11/0082 83/72 |

FOREIGN PATENT DOCUMENTS

| CN | 1500604 A | 6/2004 |
|---|---|---|
| CN | 1547521 A | 11/2004 |
| CN | 101511530 A | 8/2009 |

(Continued)

OTHER PUBLICATIONS

International Search Report corresponding to PCT Application No. PCT/EP2010/062523, mailed Dec. 28, 2010 (German and English language document) (5 pages).

*Primary Examiner* — Daniel Cavallari
(74) *Attorney, Agent, or Firm* — Maginot, Moore & Beck LLP (57) ABSTRACT

A monitoring device of a machine tool, in particular a circular saw bench, includes a safety unit having at least one first sensor. The monitoring device further includes at least one reference sensor, which is provided to convert a characterizing physical measured variable of the workpiece into an electric characteristic variable during machining of a work piece using the machine tool. The characteristic variable is provided to establish a reference value for a signal of the first sensor.

14 Claims, 4 Drawing Sheets

(56) References Cited

FOREIGN PATENT DOCUMENTS

| | | |
|---|---|---|
| DE | 10 2007 032 221 A1 | 1/2009 |
| WO | 03/006213 A2 | 1/2003 |
| WO | 2009/109250 A1 | 9/2009 |

* cited by examiner

MONITORING DEVICE OF A MACHINE TOOL

This application is a 35 U.S.C. §371 National Stage Application of PCT/EP2010/062523, filed on Aug. 27, 2010, which claims the benefit of priority to Serial No. DE 10 2009 046 040.3, filed on Oct. 27, 2009 in Germany, the disclosures of which are incorporated herein by reference in their entirety.

BACKGROUND

The disclosure is based on a monitoring apparatus for a machine tool.

The document DE 10 2007 032 221 A1 has already proposed a machine tool having a safety unit which comprises a sensor unit and an actuator system unit. The actuator system unit is intended to trigger a safety operation on the basis of a parameter sensed by the sensor unit. The machine tool has a calibration unit for calibrating the safety unit in order to prevent the actuator system unit from being triggered incorrectly on account of an altered work environment.

SUMMARY

The disclosure is based on a monitoring apparatus for a machine tool, particularly for a circular table saw, having a safety unit having at least one first sensor.

It is proposed that the monitoring apparatus have at least one reference sensor which is intended, during machining of a workpiece using the machine tool, to convert a characterizing physical measured variable from the workpiece into an electrical parameter which is intended to stipulate a reference value for a signal from the first sensor. In this connection, a "safety unit" is intended to be understood to mean particularly a unit which is intended to take a signal from the at least one sensor, in situations which present a potential hazard for an operator of the machine tool, as a basis for outputting a signal and/or particularly intervening in operation of the machine tool. In this connection, a "characterizing physical measured variable" is intended to be understood to mean particularly a quantitative description of a specific physical property of the workpiece, particularly an electrical permittivity or an electrical conductivity. In this connection, "during machining of the workpiece" is particularly intended to be understood to mean that conversions of the characterizing physical measured variable from a portion of the workpiece into electrical parameters by the reference sensor take place essentially continually and particularly from startup of the machine tool, with an interval of time of less than ten seconds between successive measurements, preferably with an interval of time of less than one second and particularly preferably with an interval of time of less than 0.2 second. In this connection, a "reference value for a signal from the first sensor" is intended to be understood to mean particularly a value which is intended to be used as a reference variable during evaluation of the signal from the first sensor in at least one operating state. As a result, in the course of operation of the machine tool, it is a simple matter to essentially compensate for any influence on the first sensor in the safety unit by the workpiece, which means that a function of the safety unit can be provided, with constant reliability, even in the case of varying physical properties of the workpiece which influence a signal from the first sensor.

If the reference sensor is intended to sense in a signal a physical measured variable which is determined essentially by a moisture content of the workpiece, it is advantageously possible to compensate for any influence on the first sensor by a varying moisture content of the workpiece, so that it is possible to allow constant reliability for the function of the safety unit. Preferably, the physical measured variable used which is determined essentially by the moisture content of the workpiece may be an electrical conductivity or an electrical permittivity.

In one advantageous refinement, the monitoring apparatus has a bearing unit which is used to support the reference sensor in a region which is arranged in front of the tool in relation to a prescribed direction of advance in which the workpiece is moved against a tool in the machine tool during machining. This arrangement allows an evaluation of the reference value and a corresponding matching operation relating to the first sensor, specifically particularly compensation for any influence on the first sensor by the workpiece, to take place effectively in a machining phase in which a body part of an operator approaches the tool, in which case the safety of the operator can advantageously be increased. A region which is arranged "in front of" the tool is intended to be understood to mean particularly a subregion of a working surface of the machine tool which is provided for laying and guiding the workpiece, which subregion is used to guide that portion of the workpiece which is intended to be machined by the tool, and/or to mean a region of the machine tool which has a projection—produced at right angles to the working surface—in this subregion of the working surface. Preferably, this subregion of the working surface is arranged directly in front of the tool. If the tool is in the form of a saw, this subregion of the working surface is advantageously crossed by a sectional plane which corresponds to the imaginary continuation of the saw blade contrary to the direction of advance and defines what is known as a saw line in the working surface.

It is also proposed that the reference sensor be in the form of a UWB sensor unit. In this connection, a "UWB sensor unit" (UWB=ultra wide band) is intended to be understood to mean particularly a sensor unit which is intended to emit and/or receive electromagnetic signals having a center frequency between 30 MHz and 15 GHz and a bandwidth of at least 500 MHz, typically a few GHz. By virtue of the reference sensor being in the form of a UWB sensor unit, it is advantageously possible to obtain a particularly high information content in relation to the characterizing physical measured variable from the workpiece. Preferably, a spectral power density of the UWB sensor unit is no more than −41.3 dBm/Hz EIRP (Equivalent Isotropic Radiated Power), which means that interference with other appliances which are operated at frequencies between 30 MHz and 15 GHz can be advantageously avoided.

In this connection, it is proposed that the UWB sensor unit be intended to be operated at a center frequency which varies discretely in a prescribed frequency range. In contrast to wideband excitation of the frequency range, this involves the UWB sensor unit being excited discretely, preferably in the form of pulsed excitation of said UWB sensor unit, with the center frequency successively assuming different discrete values in the prescribed frequency range. Preferably, frequency intervals between two successive excitation frequencies assume different values in order to take particularly effective account of regulations from regulatory authorities. In this connection, a "center frequency" for the UWB sensor unit is intended to be understood to mean particularly a frequency which is an arithmetic mean of two frequencies for which a spectral power density has fallen by 10 dB relative to a maximum spectral power density of the UWB sensor system. By varying the center frequency of the UWB sensor unit, it is possible to increase the information content in relation to the characterizing physical variable from the workpiece by means of measurements in different frequency ranges.

In one advantageous refinement, the UWB sensor unit is intended to be operated at a center frequency which varies periodically in a prescribed frequency range. In this case, the frequency range can be scanned by continuously varying the center frequency. However, it is advantageous if the UWB sensor unit is excited in an excitation sequence starting from a lower limit of the frequency range with discrete values for the center frequency, the center frequency being increased in steps until an upper limit of the frequency range has been reached, and this excitation sequence being repeated periodically.

If the monitoring apparatus comprises at least one third sensor, in the form of a UWB sensor unit, which is intended to be operated at a center frequency which is at an interval of at least 500 MHz from a center frequency for the reference sensor, it is a particularly simple manner to achieve an increase in the information content in relation to the characterizing physical variable of the workpiece by means of measurement in different frequency ranges.

It is also proposed that, of the reference sensor in the form of a UWB sensor unit and the sensor in the form of a UWB sensor unit, at least one sensor, and particularly advantageously precisely one sensor, has a coplanar antenna. In this connection, a "coplanar antenna" is intended to be understood to mean particularly an antenna which is formed by inherently known stripline elements which are arranged in one plane on a dielectric support. Preferably, the coplanar antenna may be in the form of a patch antenna or spiral antenna. In principle, however, use of other designs which appear to be appropriate to a person skilled in the art is also conceivable. By equipping one of the sensors in the form of a UWB sensor unit with a coplanar antenna, it is advantageously possible to achieve a concentration for a sensitivity range of the one sensor onto a surface of the workpiece. By equipping the other of the sensors in the form of a UWB sensor unit with an antenna which differs from a coplanar design, for example a free space antenna, it is possible to achieve averaging of the characterizing physical variable over an extensive volume range of the workpiece. Advantageously, by combining the signals from the two sensors, it is possible to distinguish a surface film of moisture, which influences the mechanical properties of the workpiece only insignificantly, from increased moisture in the interior of the workpiece, which greatly influences the mechanical properties of the workpiece.

It is also proposed that the monitoring apparatus have a bearing unit which is used to support the reference sensor at a greater depth than a working surface of the machine tool which is provided for the purpose of laying the workpiece. In this context, the term "at a greater depth" relates to a direction which is oriented at right angles to the working surface. When the machine tool is in the form of a fixed machine, this direction may correspond to the vertical direction. Such an arrangement of the reference sensor makes it possible to avoid such proximity of a workpiece material, particularly direct contact between the reference sensor and the workpiece material, as is disadvantageous for effective operation of the reference sensor.

By virtue of the bearing unit, the reference sensor is spaced apart from the working surface by an interval in a direction perpendicular to the working surface. A particularly effective sensing operation by the reference sensor can also take place when the reference sensor is spaced apart from the working surface by an air interval by means of the bearing unit. In this space that is designed to be free of material, electromagnetic waves can be produced and propagated particularly efficiently. Preferably, this is accomplished by cutting out a cavity from a material which forms the working surface. In order to provide an uninterrupted working surface for the operator, the working surface may also contain a cover means which covers said cavity from the top and serves as a subregion of the working surface.

Furthermore, it is proposed that the first sensor be in the form of a capacitive sensor and the reference sensor provide a piece of information which is a measure of a physical parameter from the workpiece and which is intended to be used to stipulate a reference value for the signal from the first sensor. Particularly advantageously, the physical parameter may be in the form of an electrical permittivity. In this connection, a "capacitive sensor" is intended to be understood to mean particularly a sensor for which the signal level is dependent on a capacitance value of a capacitor, a capacitor arrangement or a system of capacitors. In this connection, a "reference value for the signal from the first sensor" is intended to be understood to mean particularly a value which is intended to be used as a reference variable during evaluation of the signal from the capacitive sensor in at least one operating state. This makes it a simple and effective matter to provide a basis for the evaluation of the signal from the capacitive sensor which compensates for changes to the capacitance value by the workpiece, as a result of which the capacitive sensor can, with constant reliability, sense changes in the capacitance value which are caused by an operator. Preferably, the capacitive sensor is in the form of a contactlessly operating proximity sensor. In principle, however, it may also be in a form such that a signal change is triggered essentially by contact by the operator. On account of the comparatively high electrical permittivity of water in the frequency range between 30 MHz and 15 GHz, it is advantageously possible to avoid particularly any influence on the capacitive sensor in the safety unit by a varying moisture content of the workpiece.

In addition, it is proposed that the monitoring apparatus comprise an evaluation unit which is intended to ascertain from a signal from the reference sensor a measure of a physical parameter from the workpiece and to provide this measure as a signal. Advantageously, this makes it possible to provide a piece of information about material properties of the workpiece, such as the moisture content, and particularly about externally invisible materials which the workpiece contains. Particularly advantageously, the physical parameter may be in the form of an electrical permittivity. Advantageously, it is possible to detect metal inclusions, or inclusions which have a specific electrical conductivity of more than $5\times10^5$ S/m in at least one spatial direction, which the workpiece contains, so that potentially increased wear can be avoided for the machine tool or portions thereof and/or a potential hazard can be avoided for the operator. An advantage in respect of saving material is that the evaluation unit may be in a form integral with the safety unit.

Advantageously, the monitoring apparatus is equipped with a display unit which is intended to display a parameter produced by the evaluation unit on the basis of a signal from the reference sensor in order to inform an operator about a level of the characterizing physical measured variable from the workpiece by means of a visual and/or audible presentation.

In one advantageous refinement, the evaluation unit is intended to provide a specific signal in the event of a value which has been stipulated in advance for the physical parameter, for example the electrical permittivity, being exceeded. As a result, it is advantageously possible to provide a means for monitoring the safety of a machining operation and for avoiding increased wear on portions of the machine tool and/or a risk to the operator.

If the safety unit is intended to request an acknowledgment by the operator to continue operation of the machine tool in the event of a value which has been stipulated in advance for the electrical parameter from the reference sensor being exceeded, it is possible to render machining of a workpiece, which potentially involves a risk in respect of the safety of the operator and/or in respect of the increased wear on portions of the machine tool, advantageously dependent on a check and to avoid uncontrolled machining.

BRIEF DESCRIPTION OF THE DRAWINGS

Further advantages arise from the description of the drawings which follows. The drawings show exemplary embodiments of the disclosure. The drawings, the description and the claims contain numerous features in combination. A person skilled in the art will expediently also consider the features individually and combine them to form appropriate further combinations.

In the drawing.

DETAILED DESCRIPTION

Figure 1:
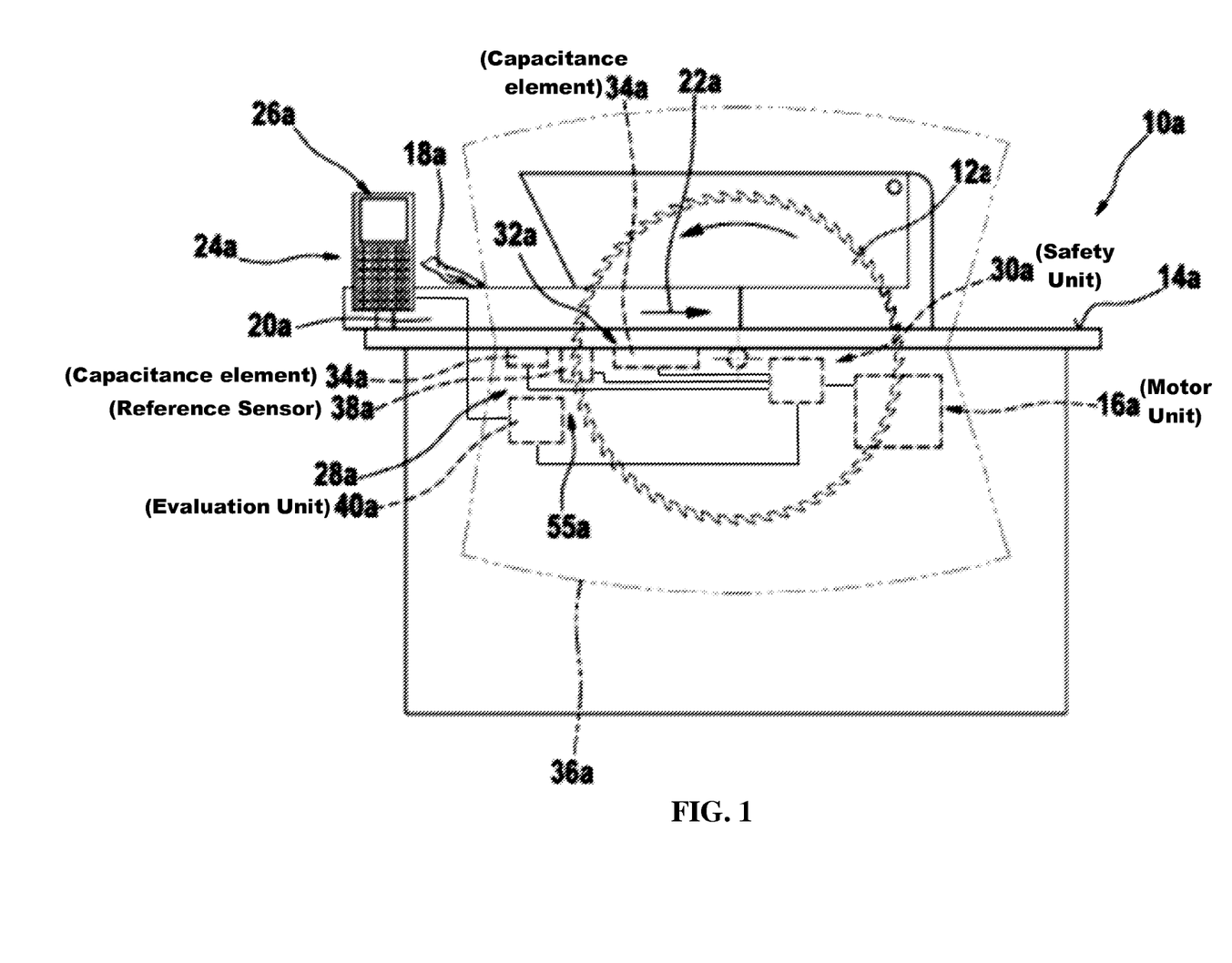
FIG. 1 shows a schematic illustration of a machine tool in the form of a circular table saw with a monitoring apparatus.
Figure 2:
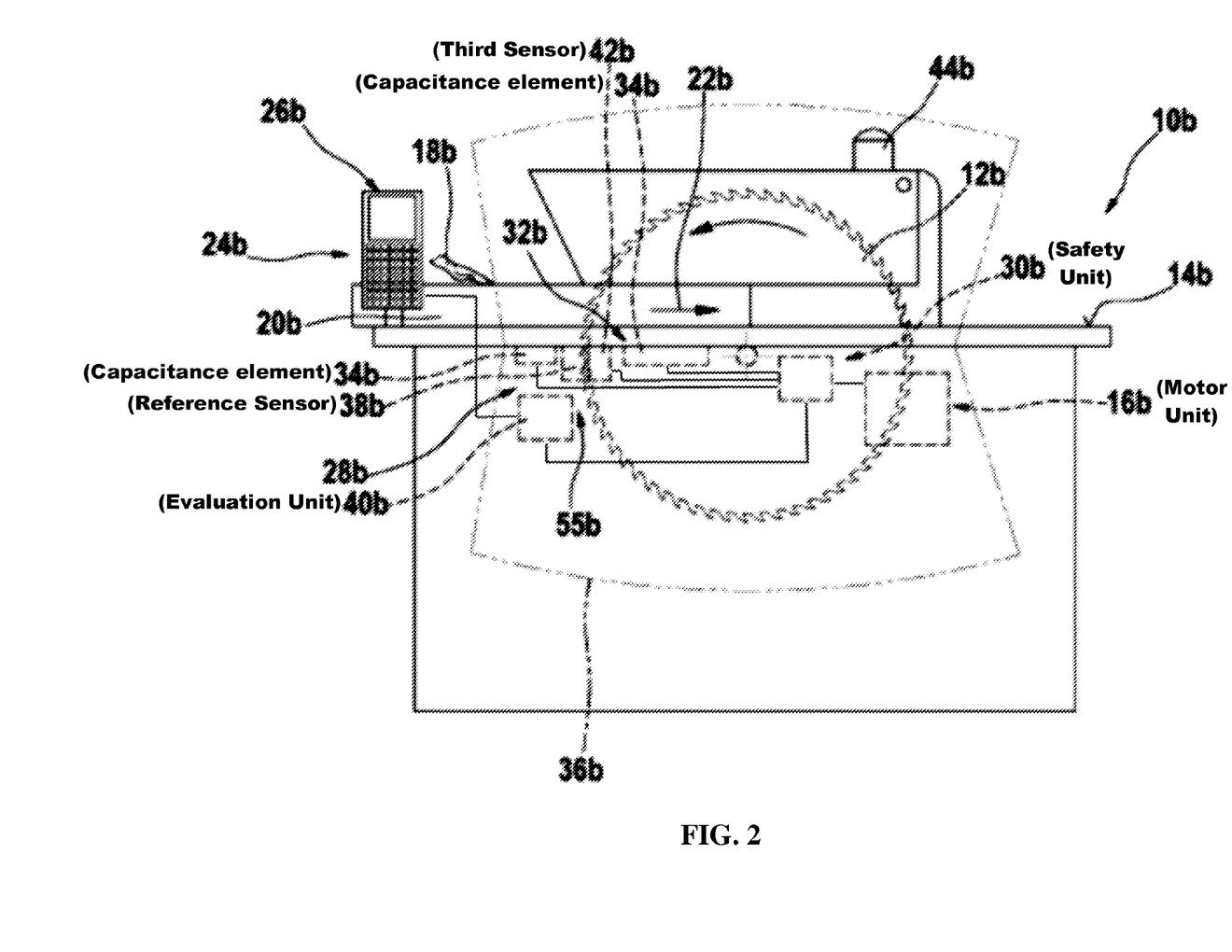
FIG. 2 shows a further embodiment of a machine tool in the form of a circular table saw with a monitoring apparatus.

FIGS. 1 and 2 show alternative exemplary embodiments. Essentially constant components, features and functions are labeled with the same reference symbols in principle. To distinguish between the exemplary embodiments, however, the reference symbols for the exemplary embodiments have the letters a and b added, with reference being able to be made to the description of the exemplary embodiment in FIG. 1 for constant components, features and functions.

FIG. 1 shows a machine tool 10a formed by a circular table saw. The machine tool 10a has a tool 12a which is formed by a circular saw blade and, in the assembled state, projects partly upwards out of a recess in a working surface 14a of the machine tool 10a. The machine tool 10a comprises a motor unit 16a which is intended to produce a drive torque for driving the tool 12a during operation. While the machine tool 10a is operating, an operator 18a imparts on a workpiece 20a in the form of a wooden beam, in a known manner, a mechanical advance along the working surface 14a in a direction of advance 22a which is directed at the tool 12a. In addition, the machine tool 10a has an input unit 24a for inputting operating parameters and a display unit 26a for inspection purposes. The machine tool 10a also comprises a safety unit 30a having a first sensor, in the form of a capacitive sensor 32a, which comprises a plurality of capacitance elements 34a which are arranged in proximity to the tool 12a and stipulate a protection region 36a which is associated with the tool 12a in the machine tool 10a. If an operator 18a of the machine tool 10a has a body part enter the protection region 36a during operation, a signal level from the capacitive sensor 32a increases. The safety unit 30a is intended, in the event of a threshold value—which is stipulated in advance and is stored in the safety unit 30a—for the capacitive sensor 32a being exceeded, to produce a signal which acts on the motor unit 16a in a known manner and switches off the drive torque for the tool 12a in order to protect the operator 18a.

In addition, the machine tool 10a comprises a monitoring apparatus 28a having a reference sensor 38a which is in the form of a UWB sensor unit and which is arranged within the protection region 36a associated with the tool 12a. The excitation of the UWB sensor unit is described in more detail with reference to FIG. 5.

The monitoring apparatus 28a is intended to start up the reference sensor 38a at the same time as the machine tool 10a and the safety unit 30a with the capacitive sensor 32a are switched on. The reference sensor 38a is intended, during machining of a workpiece 20a using the machine tool 10a, to convert a characterizing physical measured variable from the workpiece 20a into an electrical parameter which is intended to stipulate a reference value for a signal from the capacitive sensor 32a. To this end, the reference sensor 38a provides a piece of information which is a measure of an electrical permittivity of the workpiece 20a, and thereby senses in its signal a physical measured variable which is determined essentially by a moisture content of the workpiece 20a. The information provided by the reference sensor 38a is intended to be used to stipulate a reference value for the signal from the capacitive sensor 32a. In the position of the workpiece 20a which is shown in FIG. 1, there is a wooden beam portion being machined by the tool 12a simultaneously above the reference sensor 38a and in the protection region 36a associated with the tool 12a, which portion is sensed by the capacitive sensor 32a, as a result of which the moisture content of the wooden beam influences the signal from the capacitive sensor 32a and from the reference sensor 38a. The monitoring apparatus 28a also comprises an evaluation unit 40a which is intended to use a test frequency of 20 Hz to ascertain a measure of an electrical permittivity of the workpiece 20a from a signal from the reference sensor 38a and to provide said measure for the display unit 26a as a signal. The display unit 26a is intended to display a parameter produced by the evaluation unit 40a on the basis of a signal from the reference sensor 38a in order to inform an operator 18a about a level of the characterizing physical measured variable from the workpiece 20a by means of visual and audible presentation. The evaluation unit 40a is also intended to take into account the signal from the reference sensor 38a as a correction when evaluating the signal from the capacitive sensor 32a. In this way, an operating situation shown in FIG. 1 becomes an initial situation for an assessment of a potential hazard for an operator 18a of the machine tool 10a, despite the workpiece 20a which is being machined with its moisture content for the capacitive sensor 32a of the safety unit 30a. Should the moisture content of the workpiece 20a change with a machining length, the test frequency of 20 Hz, which the evaluation unit 40a uses to evaluate the signal from the reference sensor 38a, ensures sufficiently fast adjustment of the signal from the capacitive sensor 32a.

FIG. 2 likewise shows a machine tool formed by a circular table saw, said machine tool differing from that shown in FIG. 1 only in a few equipment features, which are described fully below.

A monitoring apparatus 28b as shown in FIG. 2 comprises a third sensor 42b, in the form of a UWB sensor unit, which is arranged within a protection region 36b which is associated with a tool 12b formed by a circular saw blade. The third sensor 42b is intended to be operated at a center frequency of 10 GHz. A reference sensor 38b in the form of a UWB sensor unit is intended to be operated at a center frequency of 10 GHz, which means that the center frequency of the third sensor 42b is at an interval of 2 GHz from the center frequency of the reference sensor 38b. An evaluation unit 40b in the monitoring apparatus 28b is intended to use a signal from the third sensor 42b to increase an accuracy for a signal from the reference sensor 38b.

Furthermore, the evaluation unit 40b is intended to provide a specific signal, which is formed by a signal tone and a flashing lamp 44b, in the event of a value—which is stipulated in advance and stored in the evaluation unit 40b—of the electrical permittivity being exceeded. Hence, the monitoring apparatus 28b is able to warn an operator 18b about inclusions made of iron which are hidden in a workpiece 20b in the form of a wooden beam and which are large enough for there to be a risk of increased wear for a tool 12b formed by a circular saw blade.

In addition, a safety unit 30b is intended to request acknowledgement by the operator to continue operating a machine tool 10b in the event of a value stipulated in advance for the electrical parameter from the reference sensor 38b being exceeded. The value stipulated in advance is oriented to a situation that occurs routinely during operation of the machine tool 10b and in which the machine tool 10b is intended to be used to saw a workpiece 20b in the form of a composite material with inserted, electrically conductive carbon fibers, which requires the use of a special circular saw blade, since a standard circular saw blade would be subjected to excessive wear in this situation. The acknowledgement requested by the safety unit 30b to continue operating the machine tool 10b produces a checking situation and avoids uncontrolled machining of the workpiece 20b.

Figure 3:
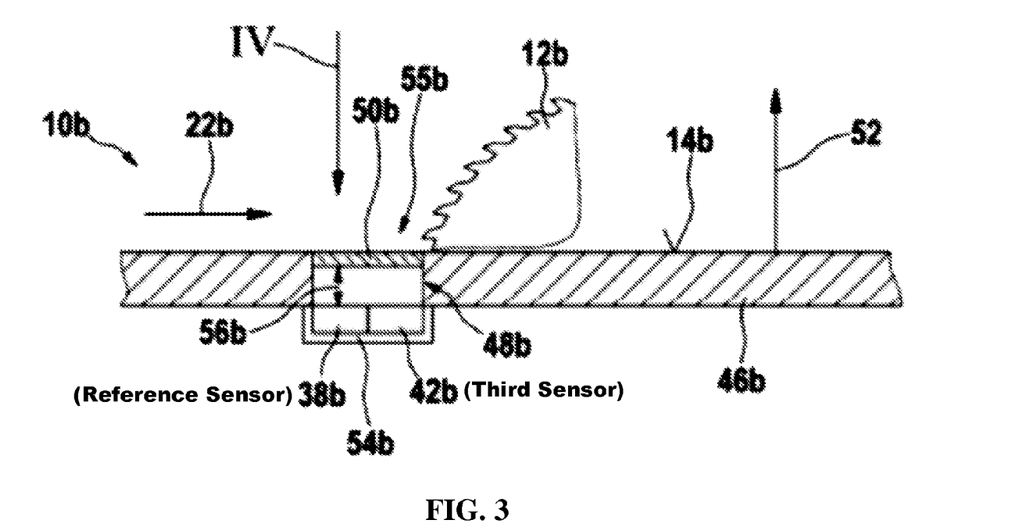
FIG. 3 shows a detail view of a working surface of the machine tool with a sensor unit, having a reference sensor, in the monitoring apparatus.

FIG. 3 shows a detail view of the machine tool 10b from FIG. 2. The description which follows, which is admittedly based on the exemplary embodiment in this FIG. 2 with a third sensor 42b, can likewise be applied accordingly to the exemplary embodiment in FIG. 1, the monitoring apparatus in this embodiment having no third sensor 42b. A material 46b which forms the working surface 14b is shown in a sectional illustration. From this material 46b, a cavity 48b is cut out which is associated with at least the reference sensor 38b. This cutout produces an interruption in the surface of the material 46b, which interruption contains a plastic window 50b as a cover portion for covering the cavity 48b and for forming a portion of the working surface 14b. This cavity 48b is adjoined by the reference sensor 38b and the third sensor 42b, which are therefore arranged at a greater depth than the working surface 14b relative to the vertical direction 52 at right angles to the working surface 14b. A bearing unit 54b supports the reference sensor 38b and the third sensor 42b in this position below the working surface 14b, specifically below the cavity 48b or, in an alternative embodiment, which is not shown, in the cavity 48b. The bearing unit 54b supports the reference sensor 38b and the third sensor 42b in region 55b of the machine tool 10b which is arranged in front of the tool 12b relative to the direction of advance 22b. In particular, the vertical projection of the reference sensor 38b or of the third sensor 42b onto the working surface 14b is arranged in a subregion of the working surface 14b which is situated directly in front of a working edge of the tool 12b. This can be seen particularly from the view in FIG. 4.

The bearing unit 54b also produces an interval between the reference sensor 38b or the third sensor 42b and the working surface 14b in the vertical direction 52, as a result of which it is possible to prevent the reference sensor 38b or the third sensor 42b from being in disadvantageous proximity to the workpiece 32b to be machined (see FIG. 1), and particularly in direct contact with the material of the workpiece 32b. A space which is left free of material between the plastic window 50b and the reference sensor 38b or the third sensor 42b forms an air interval 56b in the form of an air gap between the reference sensor 38b or the third sensor 42b and the plastic window 50b, with the reference sensor 38b or the third sensor 42b being spaced apart from the working surface 14b and from the workpiece 32b by the air interval 56b. Preferably, the air interval 56b has a vertical extent of approximately 20 mm.

Figure 4:
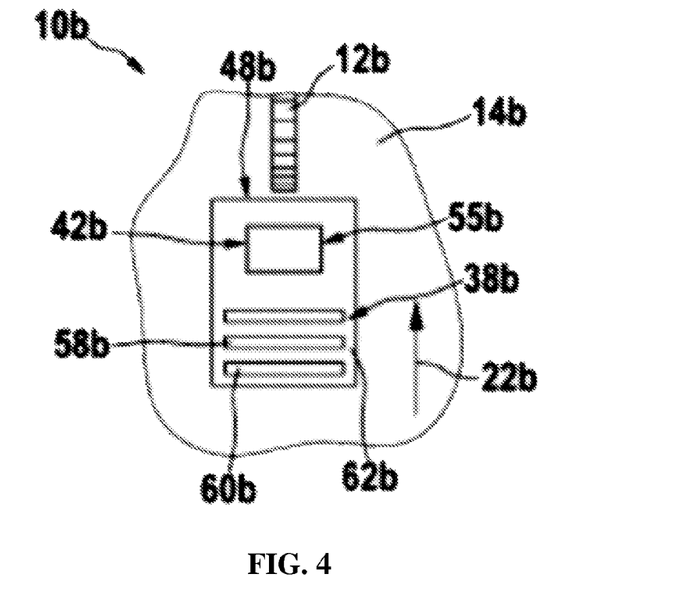
FIG. 4 shows the arrangement from FIG. 4 in a plan view from above.

FIG. 4 shows a subsection of the working surface 14b from above (see arrows IV in FIG. 3). It is possible to see the cavity 48b which is cut out from the material 46b, which cavity is associated with the reference sensor 38b or the third sensor 42b. For the purpose of describing the reference sensor 38b or the third sensor 42b, the plastic window 50b has not been shown, as a result of which it is possible to see the reference sensor 38b and the third sensor 42b in a view from above. The reference sensor 38b has a coplanar antenna 58b which has three stripline elements 60b which are arranged in one plane 62b of a dielectric support. In this configuration, the third sensor 42b is in the form of a free space antenna. In an alternative configuration, the reference sensor 38b may be in the form of a free space antenna, with the third sensor 42b having a coplanar antenna.

Figure 5:
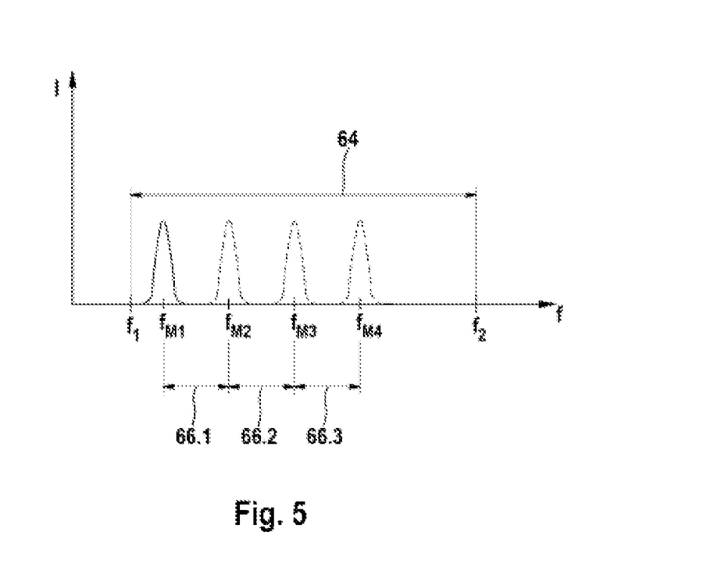
FIG. 5 shows a schematic illustration of the excitation of the reference sensor in the form of a UWB sensor.

FIG. 5 shows an X-Y graph in which a frequency f is plotted on the X axis and a signal intensity I is plotted on the Y axis. In particular, a frequency range 64 is shown in which the UWB sensor unit produced by the reference sensor 38a (FIG. 1) or by the reference sensor 38b or the third sensor 42b (FIG. 2) is operated. This frequency range 64 corresponds to an interval between a lower frequency $f_1$ and an upper frequency $f_2$ in which the relevant UWB sensor unit is excited discretely. In this context, the UWB sensor unit is excited at successive times $t_i$ at a center frequency $f_{Mi}$, where i is an index which assumes values between 1 and the number of discrete excitation frequencies in the frequency range 64. By way of example, the UWB sensor unit is operated at a center frequency $f_{M1}$ at time $t_1$, whereas it is operated at further center frequencies $f_{M2}$, $f_{M3}$, $f_{M4}$, etc., at later times $t_2$, $t_3$, $t_4$, etc., as indicated by means of dashed lines. The center frequency at which the UWB sensor unit is operated is gradually increased in steps by an amount 66.1, 66.2, 66.3, etc., the amounts 66.1, 66.2, 66.3 preferably assuming different values. The frequency range 64 can be scanned periodically or aperiodically. In one preferred exemplary embodiment, the frequency range 64 corresponds to the interval between $f_1$=2.7 GHz and $f_2$=7.5 GHz, the number of discrete center frequencies $f_{Mi}$ advantageously being above 50. The frequency range 64 is preferably scanned in approximately 2.5 ms.

The invention claimed is:

1. A monitoring apparatus for a machine having a tool that operates on a workpiece, comprising:
    a first sensor configured to generate a first signal that corresponds to a physical property of a region surrounding the tool;
    a first reference sensor configured to generate a first reference signal that corresponds to a physical property of the workpiece;
    an evaluation unit operably connected to the first reference sensor and configured to receive the first reference signal from the first reference sensor and determine a value for the physical property of the workpiece; and
    a safety unit operably connected to the first reference sensor and the first sensor, the safety unit being configured to generate a signal that at least partially turns off a motor unit that drives the tool in response to the first signal exceeding a first threshold, the first threshold being dependent on the value for the physical property of the workpiece.

2. The monitoring apparatus as claimed in claim 1, wherein the first reference signal generated by the first reference sensor corresponds to a moisture content of the workpiece.

3. The monitoring apparatus as claimed in claim 1, further comprising:
   a bearing unit configured support the first reference sensor in a region in front of the tool in relation to a prescribed direction of advance in which the workpiece is moved against the tool.

4. The monitoring apparatus as claimed in claim 1, the first reference sensor comprising:
   an ultra wide band (UWB) sensor unit.

5. The monitoring apparatus as claimed in claim 4, wherein the UWB sensor unit is configured to operate at a center frequency that varies discretely in a prescribed frequency range.

6. The monitoring apparatus as claimed in claim 4, wherein the UWB sensor unit is configured to operate at a center frequency that varies periodically in a prescribed frequency range.

7. The monitoring apparatus as claimed in claim 4, further comprising:
   a second reference sensor configured to generate a reference signal that corresponds to the physical property of the workpiece, the second reference sensor comprising a UWB sensor unit configured to operate at a center frequency that is at an interval of at least 500 MHz from a center frequency for the first reference sensor.

8. The monitoring apparatus as claimed in claim 1, wherein the first reference sensor includes an antenna having a plurality of antenna elements arranged in a coplanar orientation with a dielectric support in the first reference sensor.

9. The monitoring apparatus as claimed in claim 1, further comprising:
   a working surface configured to support the workpiece as the workpiece moves toward the tool; and
   a bearing unit configured within the working surface to support the first reference sensor beneath the working surface and opposite the workpiece.

10. The monitoring apparatus as claimed in claim 9, wherein the first reference sensor is spaced apart from the working surface by an air interval by means of the bearing unit.

11. The monitoring apparatus as claimed in claim 1, wherein:
   the first sensor comprises a capacitive sensor; and
   the first reference signal generated by the first reference sensor corresponds to a physical property of the workpiece that affects a capacitive measurement of the first sensor.

12. The monitoring apparatus as claimed in claim 1, wherein the evaluation unit is configured to generate a signal in response to the value of the physical property of the workpiece exceeding a second threshold.

13. The monitoring apparatus as claimed in claim 1, further comprising:
   a display unit configured to display the value for the physical property of the workpiece determined by the evaluation unit.

14. The monitoring apparatus as claimed in claim 1, wherein the safety unit is configured to:
   discontinue operation of the machine in response to the value of the physical property of the workpiece exceeding a second threshold;
   request an acknowledgment from an operator of the machine, after discontinuing operation of the machine; and continue operation of the machine upon receipt of the acknowledgement from the operator.

* * * * *